(12) United States Patent
Cho et al.

(10) Patent No.: US 8,848,748 B2
(45) Date of Patent: Sep. 30, 2014

(54) METHODS AND SYSTEMS FOR FIBER DELIVERY OF HIGH PEAK POWER

(75) Inventors: Gyu Cho, Ann Arbor, MI (US); Jingzhou Xu, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

(21) Appl. No.: 13/358,250

(22) Filed: Jan. 25, 2012

(65) Prior Publication Data

US 2012/0195330 A1    Aug. 2, 2012

Related U.S. Application Data

(60) Provisional application No. 61/436,890, filed on Jan. 27, 2011.

(51) Int. Cl.

| | |
|---|---|
| *H01S 3/30* | (2006.01) |
| *H01S 3/098* | (2006.01) |
| *H01S 3/00* | (2006.01) |
| H01S 3/067 | (2006.01) |
| H01S 3/13 | (2006.01) |
| H01S 3/23 | (2006.01) |

(52) U.S. Cl.
CPC ............ *H01S 3/302* (2013.01); *H01S 3/06741* (2013.01); *H01S 2301/085* (2013.01); *H01S 3/1301* (2013.01); *H01S 3/06754* (2013.01); *H01S 3/06712* (2013.01); *H01S 3/0057* (2013.01); *H01S 3/2308* (2013.01)
USPC ..................................... 372/6; 372/3; 372/18

(58) Field of Classification Search
USPC .................... 372/3, 6, 18, 107, 108
See application file for complete search history.

(56) References Cited

U.S. PATENT DOCUMENTS

| | | | |
|---|---|---|---|
| 4,676,586 | A | 6/1987 | Jones |
| 5,818,630 | A | 10/1998 | Fermann et al. |
| 5,880,877 | A | 3/1999 | Fermann et al. |
| 6,014,249 | A | 1/2000 | Fermann |
| 6,249,630 | B1 | 6/2001 | Stock et al. |
| 6,320,191 | B1 | 11/2001 | Rudd |
| 6,618,531 | B1 | 9/2003 | Goto |
| 7,505,196 | B2 | 3/2009 | Nati et al. |
| 7,711,013 | B2 | 5/2010 | Liu et al. |
| 7,800,755 | B1 | 9/2010 | Poirier |
| 7,885,311 | B2 | 2/2011 | Cho et al. |

(Continued)

OTHER PUBLICATIONS

M. Hofer, et al., "High-power 100-fs pulse generation by frequency doubling of an erbium-ytterbium-fiber master oscillator power amplifier", Optics Letters, Dec. 1, 1998, pp. 1840-1842, vol. 23, No. 23.

Govind P. Agrawal, "Nonlinear Fiber Optics", Academic Press, The Institute of Optics, University of Rochester, 1989, pp. 302 and pp. 147-153, 3rd Ed.

(Continued)

*Primary Examiner* — Armando Rodriguez
(74) *Attorney, Agent, or Firm* — Sughrue Mion, PLLC; Richard C. Turner

(57) ABSTRACT

Methods and systems for delivery of high peak power optical pulses through optical fiber are disclosed. Raman soliton generation is utilized to maintain the properties of the pulses in the delivery fiber. The apparatus can comprise any high peak power pulse source and delivery fiber supporting Raman soliton generation.

32 Claims, 6 Drawing Sheets

(56) References Cited

U.S. PATENT DOCUMENTS

| | | | | |
|---|---|---|---|---|
| 2002/0168161 A1* | 11/2002 | Price et al. | ............ | 385/123 |
| 2005/0047788 A1 | 3/2005 | Miyazaki | | |
| 2005/0111500 A1 | 5/2005 | Harter | | |
| 2008/0144673 A1 | 6/2008 | Gapontsev | | |
| 2009/0274417 A1 | 11/2009 | Ramachandran | | |
| 2010/0079853 A1* | 4/2010 | Rakich et al. | ............ | 359/334 |
| 2010/0197116 A1 | 8/2010 | Shah et al. | | |
| 2010/0226395 A1* | 9/2010 | Jiang et al. | ............ | 372/6 |
| 2011/0268140 A1* | 11/2011 | Keaton et al. | ............ | 372/3 |

OTHER PUBLICATIONS

Govind P. Agrawal, "Applications of Nonlinear Fiber Optics", Academic Press, Institute of Optics, University of Rochester, 2001, pp. 280-287.

L.F. Mollenauer, et al., "Experimental Observation of Picosecond Pulse Narrowing and Solitons in Optical Fibers", Physical Review Letters, Sep. 29, 1980, pp. 1095-1098, vol. 45, No. 13.

International Search Report; Written Opinion, (PCT/US2010/021978);dated May 23, 2012.

* cited by examiner

DOPED FIBER

FIBER SPLICE

METHODS AND SYSTEMS FOR FIBER DELIVERY OF HIGH PEAK POWER

FIELD OF THE INVENTION

The present invention relates to an apparatus and method for delivery of high peak power optical pulses through an optical fiber.

BACKGROUND

Delivery of high peak power optical pulses from a pulsed laser source to an end use apparatus through optical fiber is desirable in many laser based applications. By way of example, U.S. Pat. No. 6,249,630, entitled "Apparatus and method for delivery of dispersion-compensated ultrashort optical pulses with high peak power" and U.S. Pat. No. 6,320,191, entitled "Dispersive precompensator for use in an electromagnetic radiation generation and detection system" disclose fiber based delivery of high power ultrashort pulses and THz radiation, respectively.

In contrast to the delivery of continuous wave outputs or long pulses, nonlinear interaction of a high peak power pulse in an optical fiber can cause degradation of pulse quality. Delivering high peak intensity optical pulses can be particularly difficult if such pulses are subjected to unwanted nonlinear effects. Thus, conventional wisdom suggests that the nonlinear interaction of optical pulses in the fiber is to be avoided.

Optical solitons can evolve in fibers if self-phase modulation and anomalous dispersion are balanced, as described by L. F. Mollenauer, et al., Phys. Rev. Lett. 45. 1095-1098 (1980). The soliton propagates in the fiber without breaking the pulse in the time domain. The general conditions for soliton formation are known. The optical soliton is generated in optical fiber with anomalous dispersion, balanced with self-phase modulation and associated nonlinearity. The pulse energy applicable for this soliton formation satisfies:

$$E = 3 \cdot \frac{1.1|\beta_2|}{\gamma \Delta \tau^2},$$

where $\beta_2$ is the second order dispersion of the fiber, $\Delta\tau$ is the FWHM of the laser pulse, and $$\gamma = \frac{2\pi n_2}{A\lambda},$$

where A is the mode area. (See G. P. Agrawal, Nonlinear fiber optics, $3^{rd}$ Ed., Academic Press, p. 151). However, it can be shown that the available energy of soliton pulses is limited to not more than a few tens of picoJoules (pJ) in conventional optical fibers.

If a laser pulse contains higher energy, the pulse may be compressed with higher order soliton(s) which results in splitting of pulse. Conversely, if a laser pulse contains less energy or is attenuated during propagation, the soliton will eventually vanish. Pulse distortion occurs in either case.

Therefore, a need exists for short, high peak power pulses to be delivered to an end use apparatus without the undesirable effect of pulse breaking, particularly in laser processing environments where separation of a remote laser head and an end use apparatus is desirable.

SUMMARY OF THE INVENTION

At least one embodiment includes stimulated Raman soliton (RS) generation in a delivery fiber disposed between a pulse source and an end use apparatus. High peak power pulses are delivered to the end use apparatus without significant deterioration in the shape of a pulse received from the pulse source. Furthermore, the quality of pulses delivered to an end use apparatus may be superior to that of pulses subjected to dispersion or other non-linear effects.

At least one embodiment provides for delivery of high peak power pulses from a remote laser source to an end use apparatus without a requirement for pulse stretching and compressing to avoid non-linear effects. In various embodiments RS generation is exploited to provide high quality, compressed pulses for the end use apparatus.

If Raman shift is imparted to a pulse, and the conditions for Raman soliton formation are satisfied, the original pulse evolves into a Raman soliton during propagation. Further propagation within the fiber may contribute to an increase of wavelength shift, but the pulse shape may be approximately maintained over a useful working range.

The signal loss within a typical range suitable for a delivery fiber, for example 100 m or less, is negligible if the fiber is undoped. Importantly, a doped gain fiber is not necessary for the RS optical pulse, which can be advantageous for a delivery fiber.

In various embodiments a pulse source and delivery fiber may be configured in such a way that high quality, compressed pulses are received at an output of a delivery fiber of pre-determined length. The source may be located remote from the end use apparatus. A delivery fiber may have a length in the range from about few meters (m) to about 100 m, 20 m to 100 m, or other similar ranges. In some embodiments the laser parameters and/or fiber length may be chosen such that the pulse quality is substantially maximized at the output of the fiber, with substantial conversion of the fundamental pulse into a RS obtained therein. One indicator of pulse quality improvement is a shorter or same pulse width (e.g.: full width at half maximum, FWHM) with negligible or reduced energy in the wings (i.e.: pedestal). Pulse quality can be defined, for example, as the ratio: (full width half-maximum pulse width)/(root mean square pulse width); both these two definitions are well known in the state of the art. One or more other criteria may also be utilized, such as: a desired temporal pulse shape, for example $sech^2$ or Gaussian-like, pulse smoothness, symmetry, absence of breakup, and the like.

A pulse source can comprise any laser or amplification system with sufficient pulse energy (or intensity) having an output wavelength in a range suitable for RS generation in the delivery fiber. By way of an example, a mode locked laser oscillator may be utilized. In some embodiments an oscillator/amplifier combination may be utilized, and the amplifier may have multiple stages. Q-switched lasers can be utilized if the wavelength results in the RS condition. An Er-doped waveguide or fiber medium can be utilized for the gain material. For example, an Er or Er—Yb doped fiber oscillator with optional amplifier stage(s) can provide anomalous dispersion. In some embodiments the laser emission wavelength can be in the telecommunications window, for example about 1560 nm, and the RS fiber may be standard glass fiber.

If a wavelength shorter than 1300 nm is required, RS delivered at a longer wavelength can be converted to a shorter wavelength, for example with frequency doubling, tripling, or quadrupling. In some embodiments specialty fibers, for example holey fibers or photonic crystal fibers (PCF), may be dispersion engineered to produce anomalous dispersion at such shorter wavelengths.

By way of example, the pulse energy of femtosecond or picosecond pulses delivered to the end use apparatus may be in the range from about 1 nJ to 10 nJ, up to about 100 nJ and/or 1 µJ or greater in some implementations. A compressed pulse width may be less than 1 ps, and in some implementations may be less than about 300 ps. Pulse energy may also be scaled to higher levels. For example, a delivery fiber may receive input pulses in the range of 10 ps to 100 ps, which are then compressed with RS compression in the delivery fiber and in some implementations, pulses in the picosecond or nanosecond regime may be generated with a proportional increase in pulse energy. In various embodiments large core optical fibers may be utilized with higher peak power pulses, and configured either in step-index fiber or embedded in a photonics crystal fiber structure.

DETAILED DESCRIPTION

Figure 1:
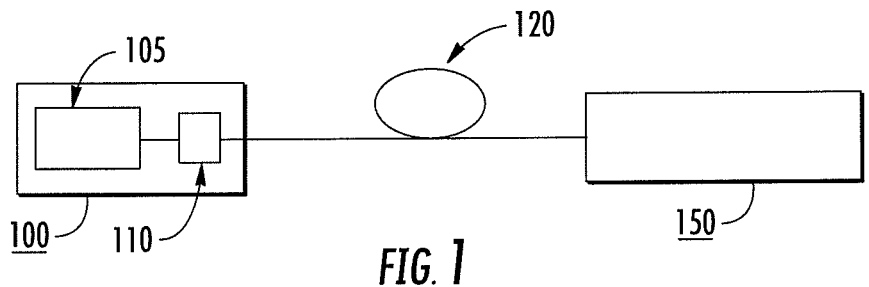
FIG. 1 schematically illustrates a general configuration of a system for delivery of high peak power optical pulses from a remotely located laser source to an end use apparatus.

Although it is not necessary to the practice of embodiments of the disclosed systems and methods to understand the underlying operative mechanisms, and without subscribing to any particular theory, it is useful to review various principles associated with Raman generation, and more particularly Raman solitons (RS), Research in femtosecond pulse compression revealed that Raman scattering can improve the quality of compressed pulses in soliton-effect compressors (See G. P. Agrawal, Applications of non-linear fiber optics, Academic Press, pp. 280-287, (2001). Under certain optical conditions the propagation properties of RS in an optical fiber are similar to that of non-Raman solitons. To enter the RS regime, the fundamental pulse initially must reach the threshold intensity for stimulated Raman scattering given by:

$$\frac{g_R P_{th} L_{eff}}{A_{eff}} \approx 16,$$

where $g_R$ is the Raman gain (on the order of $10^{-13}$ m/W), $P_{th}$ is the threshold, $L_{eff}$ is the effective length and $A_{eff}$ is the mode area. (See G. P. Agrawal, Nonlinear fiber optics, $3^{rd}$ Ed., Academic Press, p. 302, and G. P. Agrawal, Applications of non-linear fiber optics, Academic Press, pp. 280-287, (2001)). Once the intensity of the fundamental pulse exceeds that of the Raman scattering threshold, the balance between anomalous dispersion and normal chirp provided by the self phase modulation are also to be satisfied for RS propagation. By way of comparison, with similar fiber parameters and wavelength ranges, RS pulse energies can be more than two orders of magnitude higher than that of non-Raman solitons.

RS generation produces high energy and intensity pulses in fibers, for example as described in H. Hofer et al., Opt. Lett. 23, 1840 (1998) and U.S. Pat. No. 5,880,877, entitled "Apparatus and method for the generation of high-power femtosecond pulses from a fiber amplifier. The contents of U.S. Pat. No. 5,880,877 are hereby incorporated by reference in their entirety. The '877 patent teaches soliton Raman compression in fiber amplifiers and/or undoped fibers. A soliton Raman compressor was recognized as a highly nonlinear system, and the use of amplifiers or undoped large-core fibers that are slightly multi-mode may be utilized. The '877 patent teaches that a fiber amplifier and compressor can be combined in a single optical component. Alternatively, a nonlinear amplifier and a linear or a nonlinear compressor can be utilized. At least a portion of a fiber compressor can comprise undoped fiber. Applications included use in two-photon confocal microscopy wherein a nonlinear fiber amplifier provided pulse compression.

In some embodiments of the present invention formation and propagation of stimulated Raman solitons (RS) are exploited for fiber delivery of high peak power pulses. Advantageously, obtainable pulse quality of a Raman wavelength shifted pulse delivered to the end use apparatus can exceed that of a pulse subjected to other non-linear effects, even at a peak power below the Raman threshold. A pulse quality of a wavelength shifted pulse delivered to the end use apparatus may exceed that of a pulse having substantial distortion caused by a non-linear effect excluding RS generation. In accordance with various embodiments, much higher peak power can be provided with operation in the soliton Raman regime.

In various preferred implementations fiber lasers/amplifiers are utilized as a pulsed source, and in some embodiments the source may be configured with "all-fiber" arrangements. The following U.S patents and applications disclose various features of fiber laser/amplifier systems and/or end use material processing systems: U.S. patent application Ser. No. 10/813,173, entitled "Method and apparatus for controlling and protecting pulsed high power fiber amplifier systems", filed Mar. 31, 2004, Now U.S. Pat. No. 7,505,196; U.S. patent application Ser. No. 10/813,163 entitled "Modular, fiber-based chirped pulse amplification system", filed Mar. 31, 2004 Now U.S. Pat. No. 7,711,013; U.S. patent application Ser. No. 11/727,500 entitled "Beam stabilized fiber laser" filed Mar. 27, 2007; and U.S. patent application Ser. No. 12/641,256 entitled "Laser-based material processing methods and systems" filed Dec. 17, 2008. The contents of each of the above applications/patents are hereby incorporated by reference in their entirety.

FIGS. 1-8 illustrate various components and arrangements of some embodiments of the present invention. It is to be understood that the arrangements are not mutually exclusive, and elements may be combined among embodiments in suitable ways to accomplish desired design objectives.

An arrangement corresponding to an embodiment of the present invention is illustrated in FIG. 1. A pulse source 105 in laser head 100 provides optical pulses with high peak power to be used in end use apparatus 150. A pulse source may include a mode locked laser which generates ultra short laser pulses having pulse widths less than 100 ps, for example. Alternatively, optical pulses may be generated with Q-switching and/or gain switching, or any suitable combination of the above. The pulse duration can be in other ranges, for example in the nanosecond regime. The pulsed source may comprise one or more optical amplifiers to increase the pulse energy and peak power.

A suitable coupling arrangement 110 couples the high peak power pulses to delivery fiber 120. In various preferred embodiments pulse source 100 and delivery fiber 120 are configured so that Raman generation occurs in the fiber 120, preferably generating Raman solitons. Generally, the peak power provided by the pulse source is sufficiently high for Raman generation in the length of delivery fiber and at the operating (fundamental) wavelength.

Figure 1A:
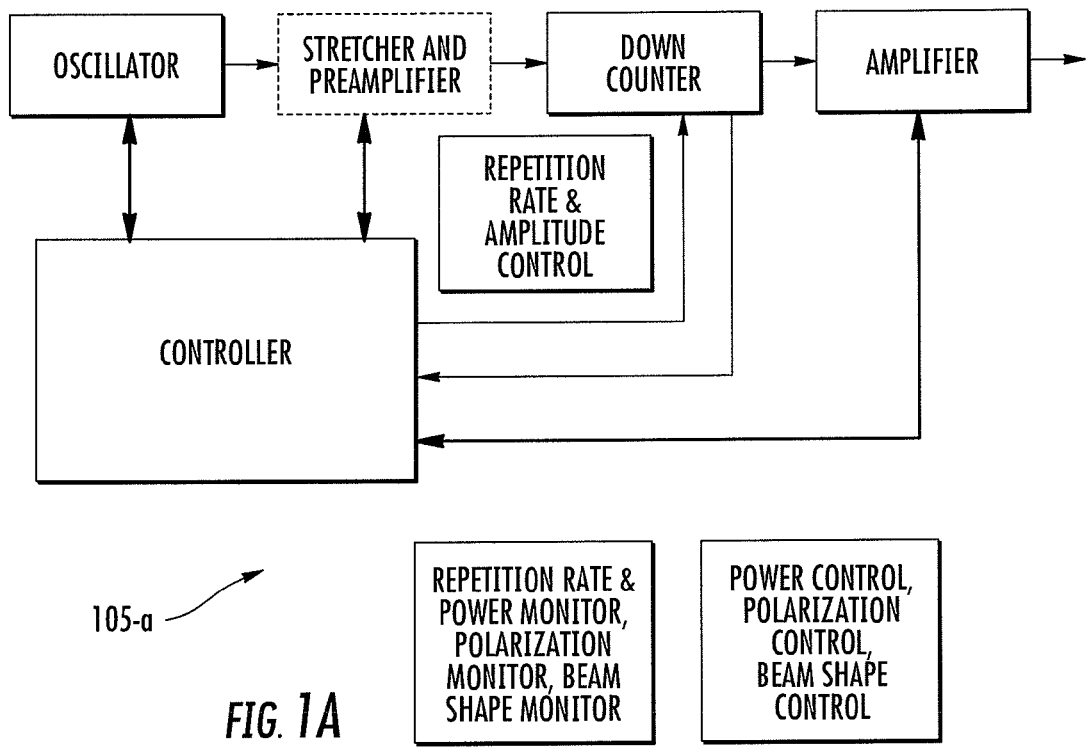
FIG. 1A schematically illustrates an exemplary fiber laser-amplifier system suitable for use with embodiments of the present invention.

FIG. 1A schematically illustrates an exemplary pulsed laser source 105-a. In this example the source includes a fiber laser-amplifier system having an oscillator, optional pre-amplifier and pulse stretcher, and a fiber amplifier. Additionally, the system includes features for controlling and protecting the fiber amplifier, and for stabilization and control of pulse characteristics. The system may further include a pulse compressor, for example a grating pair, to generate picosecond (ps) or femtosecond (fs) high peak power output pulses. Such a system, disclosed in U.S. Pat. No. 7,505,196, is one example of a suitable pulse source for generating high peak power pulses for transmission to an end use apparatus.

Figure 1B:
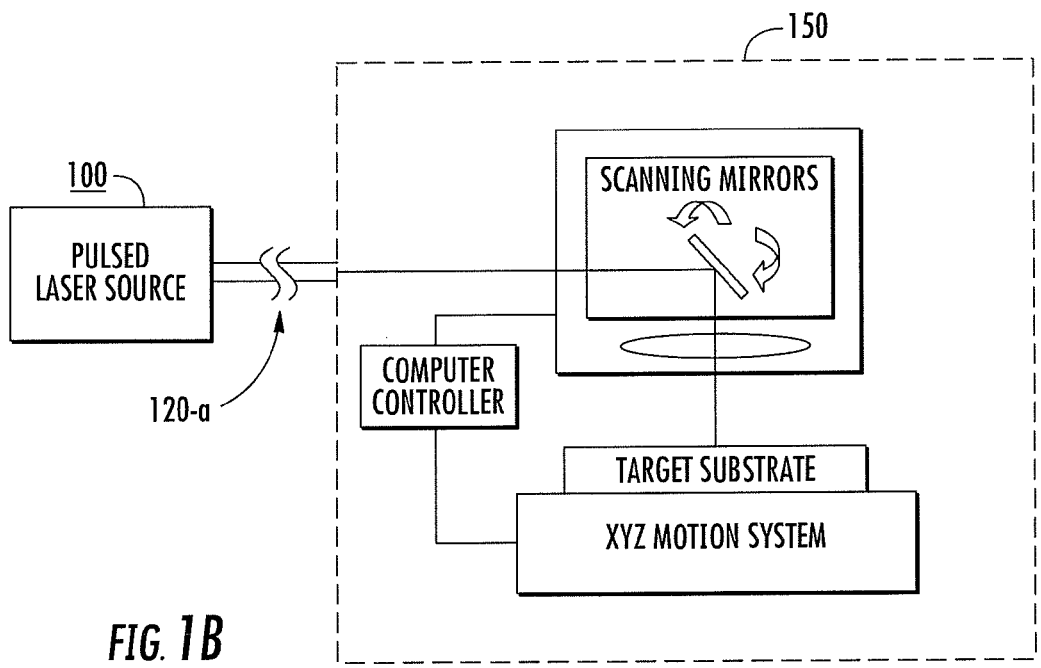
FIG. 1B schematically illustrates an exemplary end use apparatus connected to a remote pulsed laser source.

FIG. 1B schematically illustrates an exemplary end use apparatus 150 optically connected to pulse source 105 disposed in laser head 100. The connection 120-a between remotely located laser head 100 and end use apparatus 150 may comprise a delivery fiber corresponding to an embodiment of the present invention. An exemplary end use apparatus may include positioning equipment, beam scanners, and the like. In some embodiments a delivery fiber 120-a may be utilized to provide high peak power, short pulses from a remote laser source to a compact, mobile, multi-axis end use apparatus. In some embodiments the end use apparatus may include additional optical amplifiers, beam conditioning optics and the like, depending on the application requirements.

Referring back to FIGS. 1-8, delivery fiber 120 may comprise doped and/or undoped fiber portions, the latter providing some advantages discussed below.

In some embodiments single mode fiber can be implemented in a portion of the delivery fiber 120, depending on required optical parameters.

Delivery fiber 120 may include a large mode area fiber, preferred for high energy and intensity pulse delivery. For example, U.S. Pat. No. 5,818,630, entitled "Single-mode amplifiers and compressors based on multi-mode fibers" teaches how to increase the energy storage potential in an optical fiber amplifier and to produce peak powers and pulse energies which are higher than those achievable in single-mode (SM) fibers before the onset of undesirable nonlinearities and gain saturation. These optical amplification systems utilize multimode fiber amplifiers yet provide amplified outputs substantially in the fundamental mode. The contents of U.S. Pat. No. 5,818,630 are hereby incorporated by reference in their entirety. In various preferred embodiments of the present invention, RS generation in a large area core fiber provides for high peak intensity distribution yet support for a Gaussian-like mode of RS in a multimode fiber. A Gaussian-like mode profile is preferred for many end use applications. Therefore, a large area core fiber (>~40 um) can allow RS propagation for delivering high peak power pulses with an approximate Gaussian spatial profile to the end use apparatus. One advantage of using such large mode area fiber is the scalability of the RS pulse energy, while avoiding temporal and spatial degradation of pulses resulting from excessive nonlinear phase change.

Specialty fibers, for example large core holey fibers, may be used alone or in combination with step index fiber. For example, photonic bandgap fiber (PBG), photonic crystal fiber (PCF) or similar microstructured fiber(s) with a desired mode size can also be used for RS delivery fiber. Microstructured or photonic crystal fiber (PCF) can be engineered to provide the anomalous dispersion condition for RS, particularly for wavelengths shorter than 1300 nm. Such shorter wavelengths are in a positive dispersion regime of standard step index fibers.

The fiber diameter may be pre-selected such that the delivery fiber is bendable to a desired diameter without significant loss or beam degradation. In some embodiments the delivery fiber can be a polarization maintaining (PM) fiber suitable for a polarization sensitive application. Otherwise non-PM fiber may be preferred. A delivery fiber may have a length in the range from about few meters to about 100 m, 20 m to 100 m, or other similar ranges.

The application of end use apparatus 150 may include material processing, for example: laser cutting, drilling, scribing, surface texturing, patterning and/or marking. End use apparatus 150 may be utilized in imaging, pulsed laser deposition, laser spectroscopy, or for terahertz generation or detection.

FIGS. 1-8 schematically illustrate some non-limiting arrangements of delivery fibers, couplers, and components for wavelength selection/control.

The delivery fiber 120 may be a single section of fiber as illustrated in FIG. 1. A coupling arrangement 110 can be made within the laser head by either free-space coupling optics or fiber splice.

Figure 2:
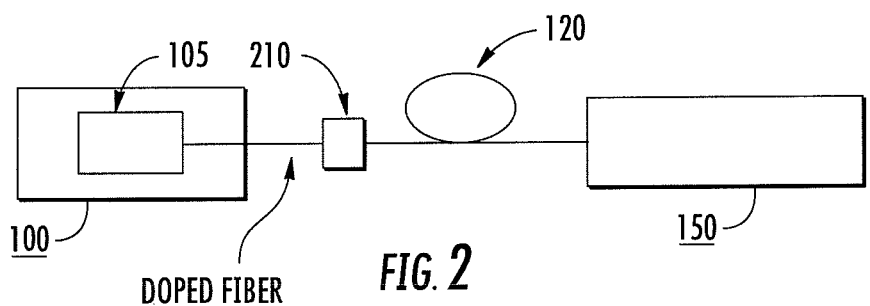
FIG. 2 schematically illustrates a configuration in which sections of doped and undoped optical fiber are used for delivery fiber.
Figure 3:
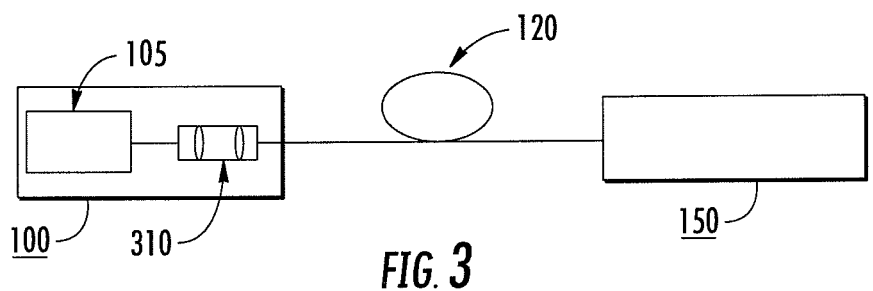
FIG. 3 schematically illustrates a configuration in which a single section of delivery fiber is coupled within the laser head by free-space coupling optics.
Figure 4:
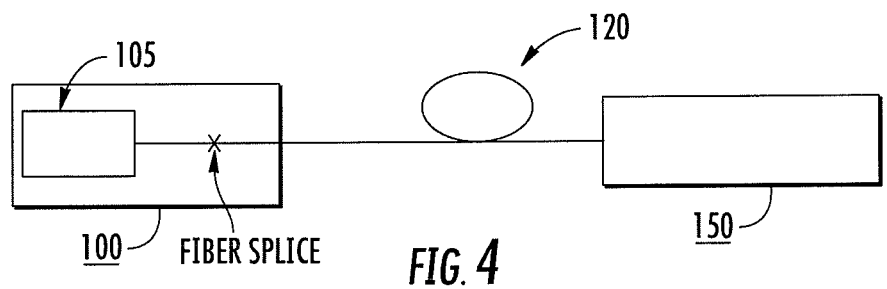
FIG. 4 schematically illustrates a configuration in which a single section of undoped fiber used for delivery fiber is coupled within the laser head by a fiber splice.

Referring to FIG. 2, in some embodiments both doped and undoped fiber may be utilized in combination for a delivery fiber. The coupling 210 between the doped and undoped fibers can also be implemented with free-space coupling optics or a fiber splice, as shown in the coupling arrangements of FIGS. 3 and 4, respectively. As shown in FIG. 3, free-space coupling optics 310 may comprise lenses to couple light from one fiber end to other fiber end. In some embodiments, and as shown in FIG. 4, a fiber splice can be made by fusing the ends of fibers to be connected together or locating end facets in optical proximity to each other without melting fiber material. Tapered fibers can be used in the fiber splice or coupling as well. Alternatively, a suitable combination of free space components, splices, and/or fiber tapers may be implemented. In some embodiments the doped gain fiber of the pulse source may be extended with an undoped fiber portion, thereby reducing the number of components.

Figure 5:
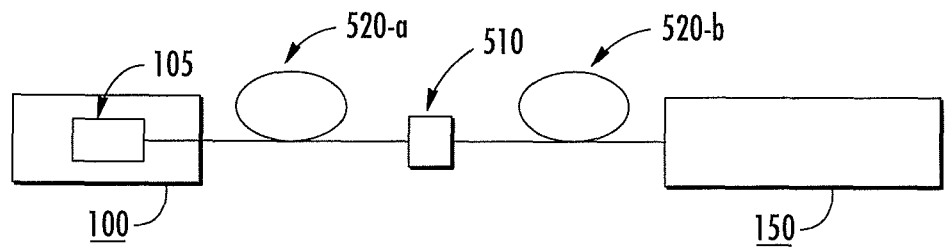
FIG. 5 schematically illustrates a configuration in which multiple sections of undoped fiber are used for the delivery fiber.

As yet another example, for further flexibility of arranging the delivery fiber in practice, the delivery fiber may comprise multiple sections. As shown in FIG. 5, sections of undoped fiber 520-a, 520-b can be coupled either by fiber splice or free-space optics with coupler 510. The sections of fiber are not limited to undoped fibers, but can comprise at least one section of undoped fiber.

Soliton propagation is not readily achievable at all wavelengths. In certain embodiments a frequency converter can be used to eliminate this problem and convert the signal wavelength into a more desirable wavelength for RS generation and propagation. A frequency (wavelength) converter generally comprises a nonlinear optical material converting the wavelength of an incident pulse to different wavelength(s) based on the nonlinear optical interaction of light intensity of the incident pulse in the nonlinear optical material. If the intensity is sufficiently high, a fiber can convert the wavelength based on nonlinear interaction. Suitable commercially available converters include non-linear crystals, Raman shifters, parametric amplifiers, and highly non-linear fibers.

In some embodiments wavelength conversion and/or filtering to modify the output wavelength of the delivery fiber before delivery to an end user apparatus may be desired, even with operation in the RS regime.

Figure 6:
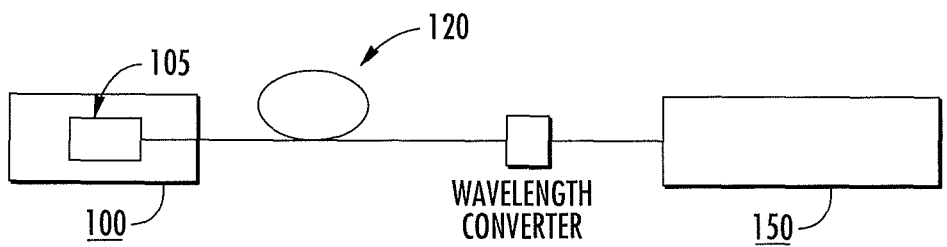
FIG. 6 schematically illustrates a configuration in which a wavelength converter is coupled to the delivery fiber.

For example, FIG. 6 depicts one arrangement in which an output is received from a portion of delivery fiber 120, then wavelength converted, and delivered to the end use apparatus. A portion of fiber 120 may be used to deliver the wavelength converted pulse.

Figure 7:
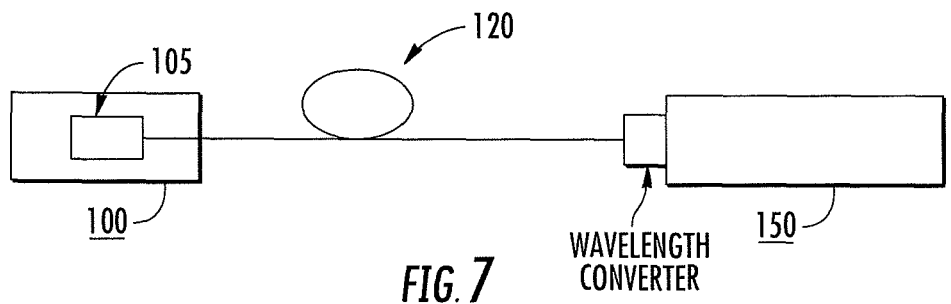
FIG. 7 schematically illustrates a configuration in which a wavelength converter is coupled to an end of the delivery fiber, and configured as an integral part of the end use apparatus.

FIG. 7 illustrates an alternative arrangement in which a wavelength converter is an integral part of the end use apparatus.

Figure 8:
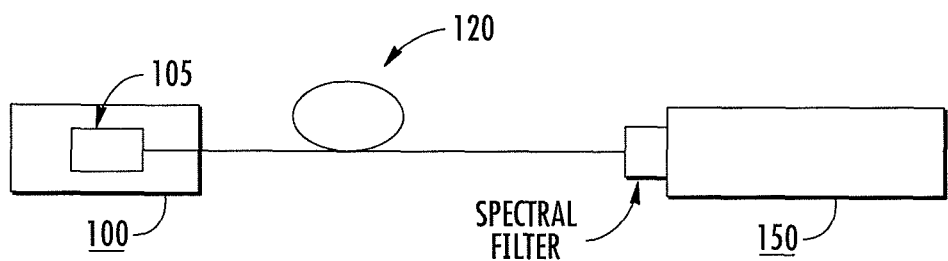
FIG. 8 schematically illustrates a configuration having a spectral filter to separate fundamental and Raman shifted pulse portions.

FIG. 8 schematically illustrates a configuration having a spectral filter to separate the fundamental and Raman shifted pulse.

Figure 9:
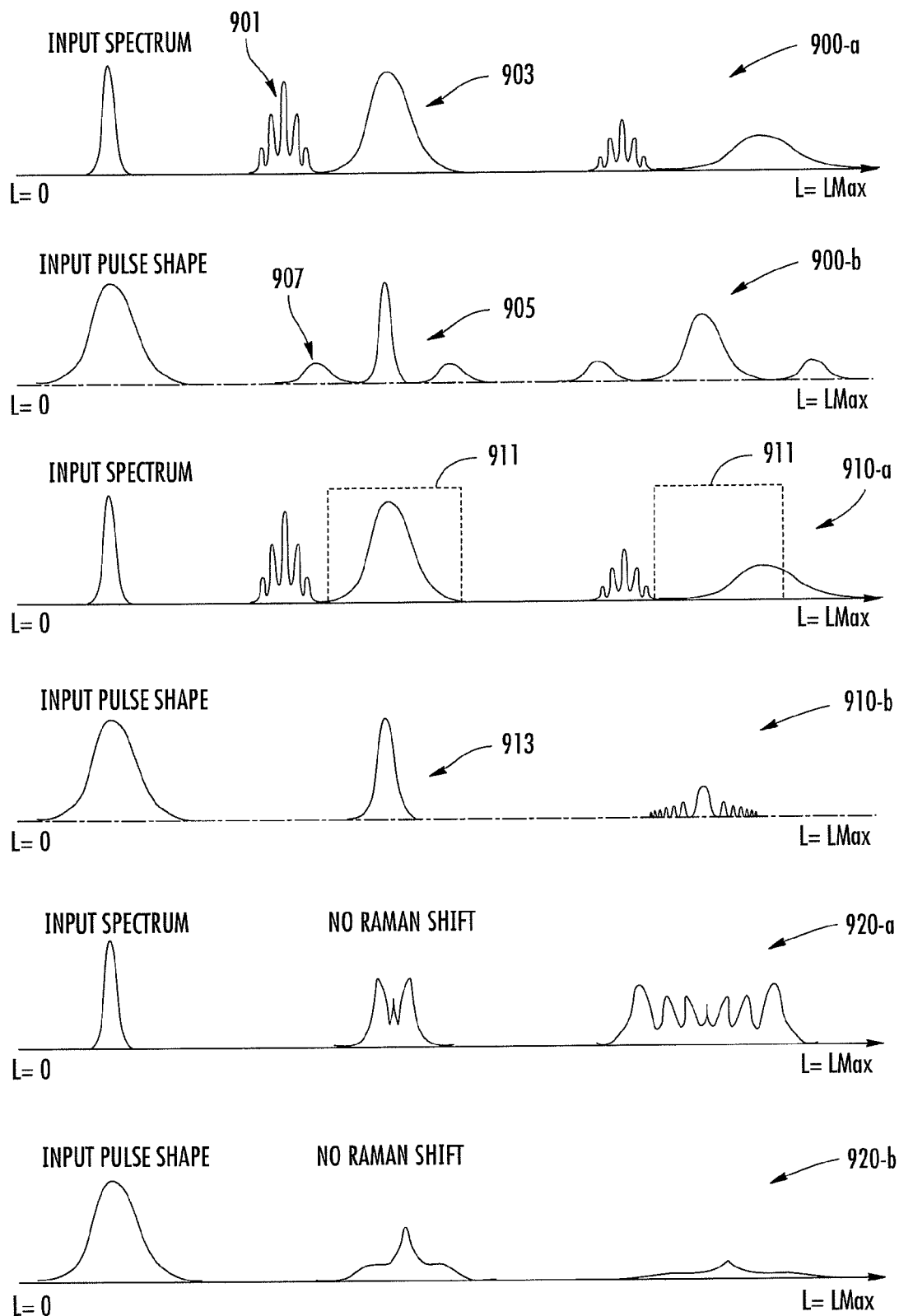
FIG. 9 schematically illustrates evolution of pulse spectra and shape in a delivery fiber, illustrating some effects of pulse propagation in the soliton Raman regime.

Referring to FIG. 9, which is not to scale, the evolution of pulse spectra and shape are illustrated in a fiber length $L_{max}$. With ultrashort pulses, for example fs pulses, the pulse shape in the time domain is estimated with the autocorrelation function (ACF). Evolution of the RS spectrum and temporal pulse shape are illustrated in the top plots 900-a and 900-b, respectively. Plots 910-a and 910-b illustrate how spectral filtering can enhance the temporal pulse shape. The bottom graphs 920-a and 920-b illustrate performance representative of high peak power, non-Raman shifted pulses degraded by non-linear effects, although at lower peak power than RS pulses.

Referring to plots 900-a and 900-b, with Raman shifting, including RS, the laser pulse spectrum is split into two major wavelength regions: a first fundamental short wavelength portion 901, with self phase modulation, and a second, smooth Raman shifted portion 903. Raman soliton pulse compression occurs if operating in the RS regime. The resultant compressed pulse 905 includes visible satellite (e.g.: pedestal) portions 907 which are undesirable.

However, the weak satellite portions 907 are the result of wave-mixing of the fundamental, non-shifted pulse, with the Raman shifted pulse. The satellite can be removed with spectral filtering the wavelength portion associated with the non-shifted pulse portion, so as to reject energy in pulse portions corresponding to spectrum 901. Referring to 910-a and 910-b, such filtering may be implemented with bandpass filter 911 or a low-pass filter in the frequency domain, for example. By implementing this measure, a broadened but high quality pulse 913 results, nearly pedestal free. Superior effects of pulse propagation in the Raman soliton regime are apparent.

In this example, the optimum fiber length coincides with a length resulting in the filtered spectrum 911 and pulse shape 903. Further propagation results in additional Raman shifting, and an increase in the spectral width and pulse width. However, optimized delivery length of the fiber can be estimated based on input pulse energy and intensity, chirp, delivery fiber mode area and other pertinent parameters. Also the gain profile in the fiber is to be considered if a section of gain fiber is included in the delivery fiber. In some embodiments the length of delivery fiber is as short as a few meters, and may be in the range from about few meters (m) to about 100 m, 10 m to 100 m, 20 m to 100 m, or other similar ranges.

Referring now to 920-a and 920-b, the non-Raman laser spectrum is modulated due to nonlinear processes such as self-phase modulation if the laser pulse energy and/or peak power is strong enough. In any case, non-linear effects and dispersion broaden the pulse and create undesirable strong pedestal, and with further spectral broadening as illustrated in 920-a and 920-b. No pulse compression is present as such, and reduction of the pedestal is difficult, even with an additional compressor device optically coupled to the delivery fiber. As illustrated, the pulse fidelity continues to decrease with further propagation. Thus, the superior performance of RS propagation and pulse compression is evident.

Experimental Results

By way of an example, an experiment was carried out to verify RS propagation in a sufficiently long delivery fiber. A goal was to generate an output without significant loss and deterioration of the pulse shape.

A mode-locked fiber laser oscillator pumped by a fiber-coupled pump diode was used. The oscillator comprised Er-doped fiber and produced a pulse of sub nano-Joule energy level at a pulse duration of a few picoseconds.

The oscillator output was further amplified in an amplifier stage. The amplifier stage comprised an Er—Yb co-doped fiber with a large mode area core pumped by a fiber-pigtailed diode laser. The gain fiber used for the experiment had pump light absorption of about −6 dB/m at 976 nm pump wavelength. The RS pulse energy in this experiment was not directly measured, but was estimated from the spectrum, and other similar measurements, to be about 2-3 nJ.

RS compression reduced the pulse width of the ps seed pulses. For convenience, the experiment was performed by extending the fiber in the amplifier stage. In the extended region the fiber did not effectively amplify the pulse because of insufficient pump light, thereby emulating a passive fiber, except for any wavelength sensitive absorption properties of the dopant in the extended region.

Figure 10:
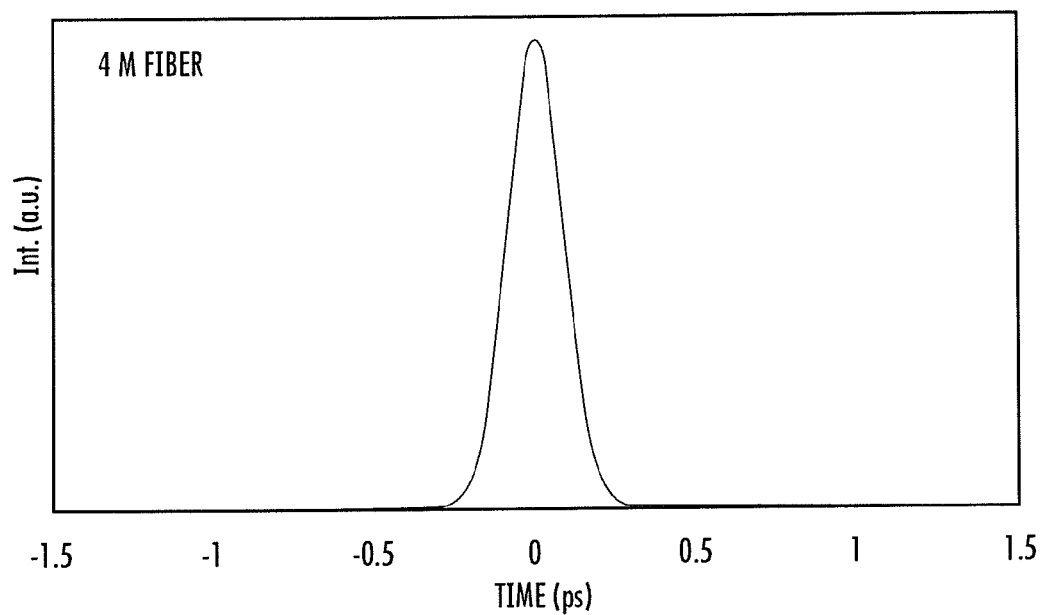
FIG. 10 is a plot illustrating a RS pulse temporal shape at an output of an amplifier fiber having a length of 4 m.
Figure 11:
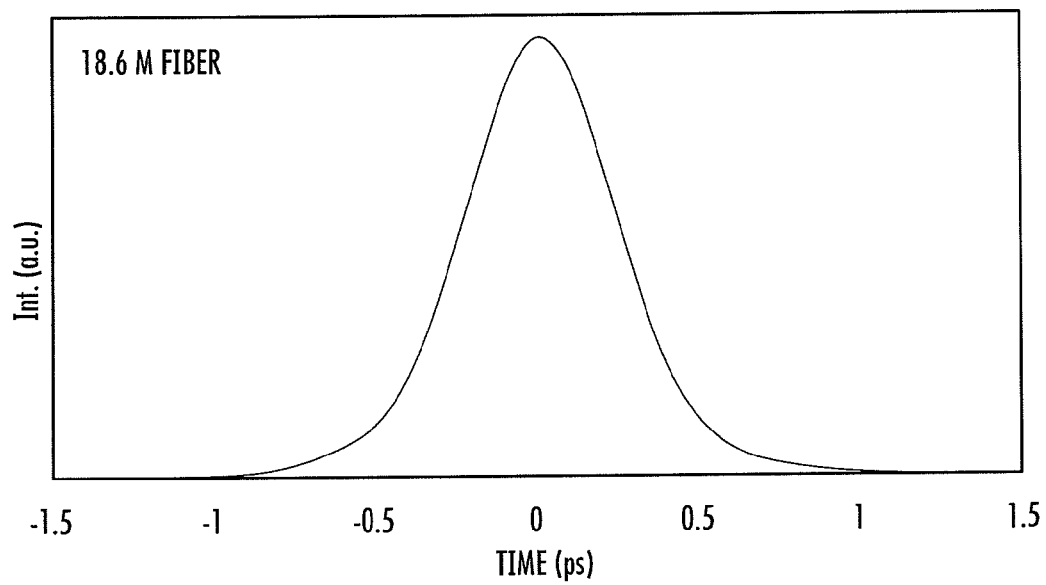
FIG. 11 is a plot illustrating a RS pulse temporal shape at an output of a 18.6 m long doped fiber. The portion beyond 5 m functions as a passive fiber as a result of a negligible amount of pump light.

As shown in FIG. 10, the pulse form exhibited with the autocorrelation function (ACF) measured at the output 4 m long amplifier fiber is essentially pedestal free at the RS wavelength. In this example the spectrum was red-shifted to 1610 nm from its fundamental of 1560 nm produced by the pulse source, a total red shift of about 50 nm. Referring to FIG. 11, as the fiber length increased to 18.6 m, the pulse shape shown in FIG. 10 was broadened to 350 fs, compared with 150 fs for 4 m of gain fiber. However, the pulse shape exhibited negligible pedestal and modulation, and the compressed output is well within the fs range.

Notably, the pump light absorption at 5 m of gain fiber resulted in residual pump light of −30 dB, which is less than 5 mW at the 5 m point. At 10 m, the pump light will remain only at a level of a few microwatts. Considering the RS power at the output was in the range of hundreds of milliwatts, the section of the gain fiber beyond 5 m could be undoped fiber, yet provide for RS generation. However, any fundamental wavelength pulse energy not converted to RS will be further attenuated in the gain fiber by the dopants, and without excitation.

In undoped fiber the lack of this attenuation at the fundamental wavelength further increases the RS conversion efficiency, resulting in more effective fiber delivery of the pulse to the end use apparatus. Thus use of undoped fiber over certain length of delivery fiber is advantageous, and establishes feasibility of using a long distance delivery fiber beyond that shown in this example. Such performance would be exceedingly difficult, if not impossible, with doped fiber.

The gain fiber length in the amplifier stage may be adjusted before being coupled to undoped fiber, depending on the laser pulse properties. Sometimes non-converted residual fundamental pulses may be present at the end of the delivery fiber. One or both of the fundamental and RS wavelengths may be used, separated spectrally, and/or filtered. Such determination can be made based on requirements of the end use application apparatus.

Figure 12:
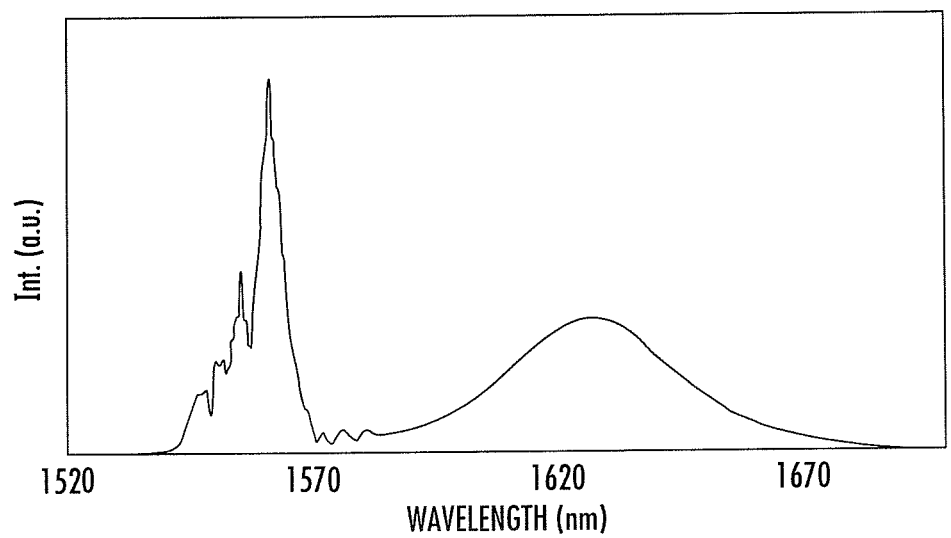
FIG. 12 is a plot illustrating the spectrum of a fundamental pulse and a Raman soliton at an approximate 1.5 um wavelength.

By way of an example, well separated wavelength ranges are shown in FIG. 12 for Raman shifted spectra. In normal dispersion wavelength regime(s), for example about 1 μm, RS generation does not occur in conventional step index fibers. However, the spectral ranges may be of interest for spectroscopic, imaging, or any other spectrally sensitive applications. A configuration providing multispectral information can be advantageous in wavelength sensitive applications and/or combining power out of different laser heads with wavelength combiners.

Based on the above results, it was determined that RS generation occurred in the amplifier fiber and the pulse energy output of the amplifier stage for the combined fundamental and RS wavelength portions can exceed 5 nJ. The power, particularly of the fundamental pulse portion, is different for short (4 m) and longer (18.6 m) fiber due to absorption of the fundamental portion of the light as discussed above. The pulse energy output from 4 m of fiber is typically 5-10 nJ, with combined fundamental and RS portions, depending on pump power. With the gain fiber length of 18.6 m, the fundamental light was absorbed and can be ignored. Thus, the output power was nearly all in the RS portion, resulting in pulse energy of about 2 nJ with the experimental arrangement.

Although RS generation in the delivery fiber is preferred, suitable alternatives may be utilized. A fiber amplifier operating at 1 um wavelength range in a positive dispersion regime is one example. If a length of dispersion shifted fiber is used as part of the delivery fiber, RS and Raman shifting without soliton formation can be combined for optimizing the pulses to be delivered to the end user apparatus. Microstructured photonic crystal fiber and/or or other suitable specialty fiber may be utilized in various implementations.

At least one embodiment includes a laser-based system. The system includes a source of high peak power optical pulses and an end use apparatus located apart from the source. The system includes an optical delivery fiber between the source and the end use apparatus, the optical delivery fiber and the pulse source configured such that a threshold for Raman soliton (RS) generation in the delivery fiber is exceeded. Wavelength shifted pulses are delivered to the end use apparatus.

At least one embodiment includes a laser system. The system includes a pulse source to generate optical pulses. A delivery fiber receives the optical pulses, wherein the pulses have sufficient peak power such that Raman soliton generation occurs in at least a portion of the delivery fiber. The system includes an end use apparatus receiving optical pulses emitted from the delivery fiber.

At least one embodiment includes a method of delivering optical pulses. The method includes generating high peak power optical pulses and coupling the high peak power optical pulses to at least one delivery fiber, the pulses having sufficient peak power to cause soliton Raman generation and compression of the high peak power optical pulses in delivery fiber. The method includes delivering the compressed pulses to an end use apparatus.

In one or more embodiments pulse quality of a wavelength shifted pulse delivered to the end use apparatus exceeds that of a pulse having substantial distortion caused by a non-linear effect other than RS generation.

In one or more embodiments soliton Raman compression in a delivery fiber may produce compressed optical pulses at an output of the delivery fiber.

In one or more embodiments a spectral filter isolates a Raman shifted pulse portion from a fundamental pulse portion, thereby reducing a pedestal of a pulse received at the end use apparatus.

In one or more embodiments optical pulses generated by a source include pulse widths less than about 10 ps, and the compressed optical pulses include pulse widths in the range from about 100 fs to about 1 ps.

In one or more embodiments a delivery fiber comprises a doped portion and an undoped portion, wherein at least a portion of soliton Raman compression occurs in the undoped portion of the delivery fiber.

In one or more embodiments optical pulses received at an end use apparatus, as compared to optical pulses at the source, are either insubstantially broadened or are compressed in an optical delivery fiber.

In one or more embodiments an end use apparatus is configured for laser material processing, spectroscopy, imaging, or a combination thereof.

In one or more embodiments a pulse source comprises a nanosecond or picosecond laser source and Raman generation comprises stimulated Raman scattering.

In one or more embodiments a delivery fiber comprises a length of doped fiber.

In one or more embodiments a delivery fiber comprises doped and undoped fiber section(s).

In one or more embodiments a system includes a wavelength converter optically coupled to an end use apparatus, in multiple-sections of the delivery fiber.

In one or more embodiments a wavelength converter coupled to a delivery fiber comprises an integral part of the end use apparatus.

In one or more embodiments a laser source comprises a mode locked fiber laser.

In one or more embodiments a laser source comprises a mode locked laser, a q-switched microchip laser, a semiconductor laser, or a combination thereof.

In one or more embodiments a source comprises a gain fiber, wherein the gain fiber and the delivery fiber are portions of the same optical fiber.

In one or more embodiments an optical delivery fiber comprises a length of large mode area fiber.

In one or more embodiments a delivery fiber comprises a length of gain fiber and undoped fiber joined with a fiber splice.

In one or more embodiments a laser pulse is coupled with a free-space optical coupler located between separate lengths of optical fibers, a first length of the optical fiber being between the source and the coupler and a second length of the optical fiber being between an end use apparatus and the coupler.

In one or more embodiments a fiber comprises a length of polarization maintaining fiber.

In one or more embodiments a frequency converter is coupled to an end of an optical delivery fiber.

In one or more embodiments a pulse source comprises a fiber amplifier.

In one or more embodiments a fiber amplifier is a delivery fiber.

In one or more embodiments a fiber amplifier and a delivery fiber are portions of the same optical fiber.

In one or more embodiments at least a portion of a delivery fiber comprises a large mode area fiber.

In one or more embodiments a laser-based system includes a wavelength sensitive bulk element, an integrated element, a fiber optic element, or a combination thereof, to separate the Raman shifted spectra and source spectra into a plurality of wavelength bands.

In one or more embodiments at least a portion of the pulses delivered to an end use apparatus have pulse energy of at least about 1 µJ and a pulse width less than about 1 ps.

In one or more embodiments, at least a portion of pulses delivered to an end use apparatus have pulse width in the range from about 100 ps to 1 ns.

In one or more embodiments a length of delivery fiber is in the range from a few meters to about 100 m.

In one or more embodiments a length of delivery fiber is in the range from about 20 in to about 100 m.

In one or more embodiments a delivery fiber and a source are configured in such a way that a high quality, compressed pulse is emitted at an end of the fiber and delivered to the end use apparatus.

In one or more embodiments the compressed pulses comprise a pulse width substantially corresponding to a minimum pulse width propagating within the delivery fiber.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A laser-based system, comprising:
   a source of high peak power optical pulses, wherein said source is configured to generate optical pulses having a pulse width less than about 100 ps;
   an end use apparatus located remotely from said source and optically connected to said source; and
   an optical delivery fiber between said source and said end use apparatus, said optical delivery fiber and said source configured such that said optical pulses have sufficient peak power to exceed a threshold for Raman soliton (RS) generation in said optical delivery fiber, said optical delivery fiber configured to receive said optical pulses at a delivery fiber input end and, via Raman soliton generation and propagation, to provide wavelength shifted pulses at an output end thereof,
   wherein said source is disposed in a laser head connected to said end use apparatus via said optical delivery fiber, and wherein a wavelength shifted pulse is delivered to said end use apparatus via said optical delivery fiber.

2. The laser-based system of claim 1, wherein soliton Raman compression in said delivery fiber produces compressed optical pulses at an output of said delivery fiber.

3. The laser-based system of claim 2, further comprising: a spectral filter disposed downstream from said source and from said delivery fiber input end to isolate a Raman shifted pulse portion from a fundamental pulse portion, thereby reducing a pedestal of a pulse received at said end use apparatus.

4. The laser-based system of claim 2, wherein said optical pulses generated by said source comprise pulse widths less than about 10 ps, and said compressed optical pulses comprise pulse widths in the range from about 100 fs to about 1 ps.

5. The laser-based system of claim 2, wherein said delivery fiber comprises a doped portion and an undoped portion, and wherein a portion of said soliton Raman compression occurs in said undoped portion of said delivery fiber.

6. The laser-based system of claim 1, wherein optical pulses as received at said end use apparatus, as compared to said optical pulses generated by said source, are either insubstantially broadened or are compressed.

7. The laser-based system of claim 1, wherein said end use apparatus is configured for laser material processing, spectroscopy or imaging.

8. The laser-based system of claim 1, wherein the delivery fiber comprises a length of doped fiber.

9. The laser-based system of claim 1, wherein said delivery fiber comprises doped and undoped fiber sections.

10. The laser-based system of claim 1, further comprising a wavelength converter optically coupled to said end use apparatus, said wavelength converter disposed between multiple-sections of said delivery fiber.

11. The laser-based system of claim 10, wherein the wavelength converter coupled to the delivery fiber comprises an integral part of said end use apparatus.

12. The laser-based system of claim 1, wherein said laser source comprises a mode locked fiber laser.

13. The laser-based system of claim 1, wherein said laser source comprises a mode locked laser, a q-switched microchip laser, or a semiconductor laser.

14. The laser-based system of claim 1, wherein said source comprises a gain fiber, wherein said gain fiber and said delivery fiber comprise portions of the same optical fiber.

15. The laser-based system of claim 1, wherein said delivery fiber comprises a length of gain fiber and undoped fiber joined with a fiber splice.

16. The laser-based system of claim 1, wherein a laser pulse is coupled with a free-space optical coupler located between separate lengths of optical fibers, a first length of said optical fiber being between said source and said coupler and a second length of said optical fiber being between said end use apparatus and said coupler.

17. The laser-based system of claim 1, wherein said delivery fiber comprises a length of polarization maintaining fiber.

18. The laser-based system of claim 1, wherein a frequency converter is coupled to an end of said optical delivery fiber.

19. The laser-based system of claim 1, wherein a pulse quality of a wavelength shifted pulse delivered to said end use apparatus exceeds that of a pulse having substantial distortion caused by a non-linear effect other than RS generation.

20. The laser-based system of claim 1, wherein said pulse source comprises a fiber amplifier.

21. The laser-based system of claim 20, wherein said fiber amplifier is said delivery fiber.

22. The laser-based system of claim 20, wherein said fiber amplifier and said delivery fiber are portions of the same optical fiber.

23. The laser-based system of claim 1, wherein at least a portion of said delivery fiber comprises a large mode area multimode fiber.

24. The laser-based system of claim 1, further comprising: a wavelength sensitive bulk element, an integrated element, or a fiber optic element to separate Raman shifted spectra and source spectra into a plurality of wavelength bands.

25. The laser-based system of claim 1, wherein at least a portion of said pulses delivered to said end use apparatus have a pulse energy of at least about 1 µJ and a pulse width less than about 1 ps.

26. The laser-based system of claim 1, wherein a length of said delivery fiber is in the range from a few meters to about 100 m.

27. The laser-based system of claim 1, wherein a length of said delivery fiber is in the range from about 20 m to about 100 m.

28. The laser-based system of claim 1, wherein said delivery fiber and said source are arranged in such a way a pulse quality of a wavelength shifted pulse delivered to said end use apparatus exceeds that of a pulse having substantial distortion caused by a non-linear effect other than RS generation.

29. The laser based system of claim 2, wherein said compressed pulses have a pulse width which is the minimum pulse width propagating within said delivery fiber.

30. The laser-based system of claim 1, wherein said source and said delivery fiber are configured to deliver ultrashort pulses having pulse energies in the range from 1 nJ and up to about 100 nJ to said end use apparatus via said delivery fiber.

31. The laser based system of claim 1, wherein said delivery fiber comprises one or more of step index fiber, photonic bandgap fiber (PBG), photonic crystal fiber (PCF), or microstructured fiber(s).

32. The laser based system of claim 31, wherein said delivery fiber comprises a large core diameter of at least about 40 µm.

* * * * *